(12) United States Patent
Shibata

(10) Patent No.: US 9,853,430 B2
(45) Date of Patent: Dec. 26, 2017

(54) MANUFACTURING METHOD FOR PLUG FOR HOLE CREATED IN PLATE AND PLUG FOR HOLE CREATED IN PLATE

(71) Applicant: Tsuyako Shibata, Hashima (JP)

(72) Inventor: Tsuyako Shibata, Hashima (JP)

( * ) Notice: Subject to any disclaimer, the term of this patent is extended or adjusted under 35 U.S.C. 154(b) by 46 days.

(21) Appl. No.: 14/507,942

(22) Filed: Oct. 7, 2014

(65) Prior Publication Data

US 2016/0068309 A1   Mar. 10, 2016

(51) Int. Cl.
*B65D 39/02*   (2006.01)
*H02G 3/08*   (2006.01)

(52) U.S. Cl.
CPC ................... *H02G 3/085* (2013.01)

(58) Field of Classification Search
CPC .... B65D 39/025; B65D 51/145; B65D 51/14; E04F 19/08
USPC ......................................................... 220/3.8
See application file for complete search history.

(56) References Cited

U.S. PATENT DOCUMENTS

| | | | | |
|---|---|---|---|---|
| 2,626,080 | A * | 1/1953 | Fernberg ................ | B62D 25/24 220/326 |
| 5,186,592 | A * | 2/1993 | Budenbender ....... | B23K 26/206 219/121.64 |
| 6,423,900 | B1 * | 7/2002 | Soules ................... | H01H 9/185 174/66 |
| 8,770,424 | B1 * | 7/2014 | Shaw ...................... | H02G 3/14 220/242 |

FOREIGN PATENT DOCUMENTS

JP   2001-078332 A   3/2001

* cited by examiner

*Primary Examiner* — Jeffrey Allen
(74) *Attorney, Agent, or Firm* — Polsinelli PC

(57) ABSTRACT

A plug with which the opening of a hole can be covered through a one-touch operation in which a plugging member is pressed against a plate is provided. A plugging member having a size sufficiently large enough to cover the hole created in the plate of which the opening is to be covered is provided with a protruding portion in bridge form that is formed by making a part of the member protrude from the rear surface of the plugging member, the support plate lies in the gap between the bottom surface of the protruding portion and the rear surface of the plugging member where the support plate is formed of an elastic material and extends in the direction from left to right so that the two ends protrude to the outside from the outer periphery of the plugging member so as to be able to be bent between fingers.

12 Claims, 8 Drawing Sheets

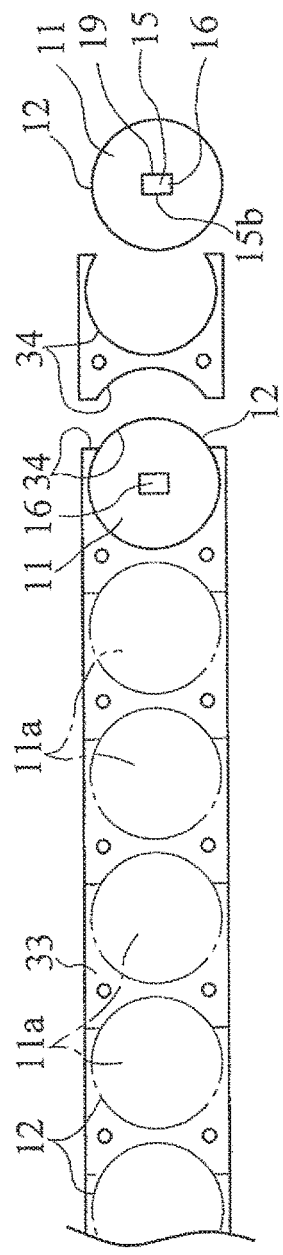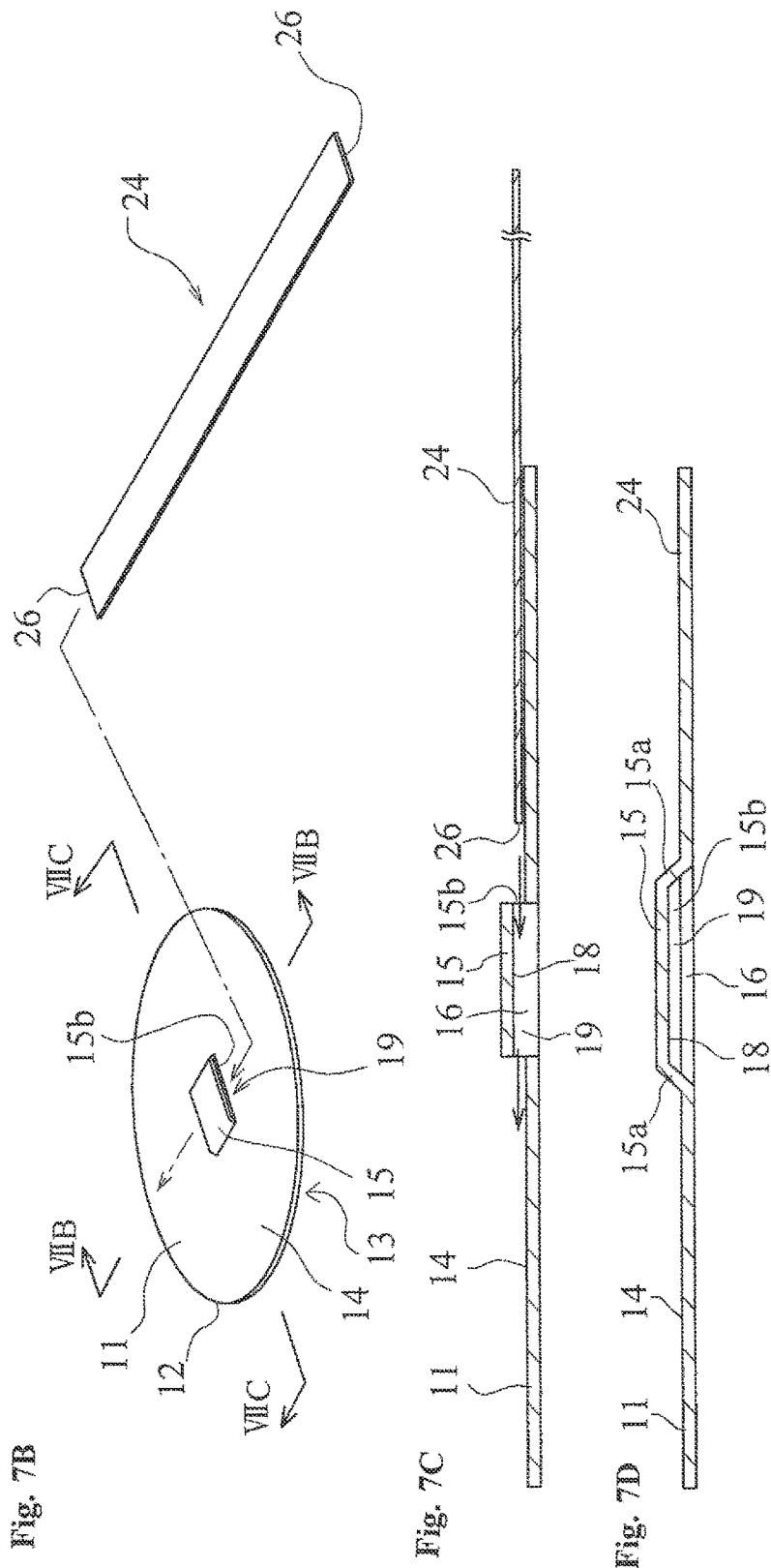

MANUFACTURING METHOD FOR PLUG FOR HOLE CREATED IN PLATE AND PLUG FOR HOLE CREATED IN PLATE

CROSS REFERENCE TO RELATED APPLICATIONS

This application claims priority to Application No. 2014-181540 filed in Japan on Sep. 5, 2014, under 35 U.S.C. §119, the entire contents of which are hereby incorporated by reference.

FIELD OF THE INVENTION

The present invention relates to a plug used for covering an unnecessary hole created in a plate in the case where the hole is created by mistake or in the case where the plate is to be reused as well as a manufacturing method for the plug.

BACKGROUND OF THE INVENTION

There are many cases where a hole that has been carelessly created in a plate causes a problem.

For example, each of the four walls (plates) 2, 2, 2, and 2 that form a box for wiring in Patent Document 1 or a well-known outlet box 1 shown in FIGS. 1 and 6 in the present application is provided with a number of holes 3, 3, . . . 3 of which the sizes are different for connecting a wire pipe, and all of the holes 3 for connecting a wire pipe are respectively provided with a blind cover in proximity to the inner periphery 5 in such a state that the blind cover is linked to inner periphery of each hole 3, as shown in FIGS. 1 and 6, with microscopic linking portions 6 (points of attachment) so that detachment and separation are easy.

Thus, the holes 3 for connecting a wire pipe can be respectively covered by a blind cover so that bugs and the like can be prevented from entering the box 1. Meanwhile, in the case where a wire pipe is connected to the box 1, a blind cover 4 can be easily removed in a well-known manner so that a hole 3a for connecting a wire pipe is opened, which makes it easy to connect a wire pipe through the hole 3a.

PRIOR ART DOCUMENT

Patent Document

Patent Document 1: Japanese Unexamined Patent Publication 2001-78332

DISCLOSURE OF THE INVENTION

Problems to Be Solved by the Invention

The blind covers 4 are linked to the inner peripheries 5 of the holes 3 for connecting a wire pipe through microscopic linking portions 6 so that detachment and separation are easy, and therefore, an unexpected external pressure or a mistakenly applied external pressure may separate a blind cover 4 so as to create an unexpected hole 3a in a plate 2, which is a wall of the box 1. In such a case, it may be technically difficult to cover the unexpected hole 3a, and such a problem may arise that unnecessary time and effort are required for this work.

In the case where it is desired to reuse a plate that has become unnecessary in other places and there is an unnecessary hole that had been previously made in the plate, such a problem arises that the unnecessary hole makes it difficult to reuse the plate.

BRIEF SUMMARY OF THE INVENTION

An object of the present invention is to solve the above-described problems and to provide a plug with which the opening of a hole can be covered through a one-touch operation in which a plugging member is pressed against the plate.

Another object is to provide a plug of which the plugging member can be engaged with a hole in a plate through an operation only on the front side (one side of the plate).

Still another object is to provide a manufacturing method for a plug that can be formed of two plate materials at an extremely low cost.

Other problems to be solved, objects, and advantages of the invention will be easily clarified from the drawings and the following descriptions relating to them.

A manufacturing method for a plug for a hole created in a plate according to the present invention comprises:
  a preparation step of preparing a plugging member and a support plate together, wherein
  the plugging member is formed of the plate of which size is sufficiently large enough to cover the hole created in the plate of which an opening is to be covered,
  a protruding portion in bridge form is formed on a rear side of the plugging member in approximately a center portion by making a part of a member protrude from the rear surface of the plugging member,
  the protruding portion in bridge form protrudes in such a state that a gap is created between a bottom surface of the protruding portion in bridge form and the rear surface of the plugging member,
  the support plate can be inserted through the gap in a direction from left to right in such a state that the support plate lies along the rear surface of the plugging member, and
  the support plate is formed of an elastic material in a band plate form; and
  an insertion step of inserting said support plate into the gap between the bottom surface of the protruding portion in bridge form on said plugging member and the rear surface of the plugging member in such a state that said support plate lies along the rear surface of the plugging member and two ends of the support plate respectively protrude from an outer periphery of the plugging member.

A manufacturing method for the plug for the hole created in the plate according to claim 1, characterized in that said plugging member is formed of a metal material, and a pressure applying step of applying pressure to the protruding portion in bridge form on the plugging member towards the support plate inside the protruding portion is carried out so that a degree of contact between the bottom surface of the protruding portion and the facing surface of the support plate is increased.

A manufacturing method for the plug for the hole created in the plate according to claim 1, characterized in that said plugging member is formed of a synthetic resin material, and a pressure applying step of applying heat to the protruding portion in bridge form on the plugging member while simultaneously applying pressure towards the support plate inside the protruding portion is carried out so that the degree of contact between the bottom surface of the protruding portion and the facing surface of the support plate is increased.

A plug for a hole created in a plate, comprising a plugging member and a support plate, according to the present invention is that the plugging member is formed of the plate of which size is sufficiently large enough to cover the hole created in the plate of which an opening is to be covered, a protruding portion in bridge form is formed on a rear side of the plugging member in approximately a center portion by making a part of a member protrude from the rear surface of the plugging member, the protruding portion in bridge form protrudes in such a state that a gap is created between a bottom surface of the protruding portion in bridge form and the rear surface of the plugging member, a support plate is inserted through the gap in a direction from left to right in such a state that the support plate lies along the rear surface of the plugging member, and the support plate that lies inside said protruding portion in bridge form is formed of an elastic material in a band plate form, is positioned in such a state that a portion that is approximately at a center of the support plate is supported inside the protruding portion, and extends in the direction from left to right so that two ends protrude to outside from an outer periphery of the plugging member so as to be able to be bent between fingers.

As described above, the present invention has such effects that the efficiency in the work of attaching a plugging member to a hole is high because the opening of the hole can be covered with the plugging member through a one-touch operation where the ends of a support plate that protrude from the two sides of the plugging member are pinched, and the ends are inserted into the hole from the front side of the plate so that the plugging member is pressed against the plate, and in this state, the plugging member is secured to the plate.

The entirety of the above-described attachment work can be carried out on the front side of the plate (one side of the plate), and therefore, the attachment work is characterized in that the worker can carry out the operation only on the front side of the plate, particularly in the case where the area of the plate is wide.

Thus, no work is necessary on the rear side of the plate, and therefore, there is such an advantage that the attachment work is possible irrelevant of the situation on the rear side, for example, the rear side of the plate is closed with other objects or there is an obstacle on the rear side.

Furthermore, in the state where the plugging member is engaged with the plate, the point at which the support plate having elasticity is engaged with the plugging member is in approximately the center portion, from which the support plate extends to the two sides so that the points through which the support plate makes contact are located on the free end sides, and therefore, the plugging member is always located at the point in the middle of the inner periphery of the hole of the plate due to the effects of the contact points on the two sides with appropriate balance, that is to say, the plugging member keeps the opening of the hole covered by staying at the center relative to the hole of the plate.

Namely, the points through which the support plate makes contact with the edge of a hole on the two sides, when the support plate extends in a reverse V shape on the rear side of a plate, are characterized by working through the elastic contact such that the center of the plugging member is located in the center portion of the hole (at the center location between two sides of the edge of the hole).

As a result, the center of the plugging member can always be located at the center of a hole even when the diameter of the hole is greatly smaller or barely larger than the diameter of the plugging member, and thus, there is such an advantage that it is possible to cover the opening of holes having different sizes with a plugging member of one size.

In addition, the structure of the plug having the above-described effects is simple. That is to say, the plug is formed of two members, one plate material and an elastic plate inserted through a protruding portion provided with the plate material, and therefore, there is such an effect that the plug can be provided at an extremely low cost.

Furthermore, the plug is formed of two members as described above, where a combination of the two is achieved by providing a protruding portion at the center of the plugging member formed of one plate and inserting one elastic plate through the protruding portion so that the elastic plate is parallel to the plugging member, and therefore, the number of manufacturing steps is small. From this point of view as well, the invention has such an effect that the plug can be provided at a low cost.

Moreover, the plug made of two members as described above is in such a state that the two members are layered on top of each other so as to be parallel to each other, and therefore, a great number of plugs can be layered on top of each other by keeping the volume extremely small, and thus, the plug is characterized by being portable in such a manner that a great number of plugs can be carried around in a small volume at a work site.

BRIEF DESCRIPTION OF THE DRAWINGS

FIG. 7A is a plan diagram for illustrating the step of punching out a great number of plugging members from one base material in band form through a pressing means;

FIG. 7B is an exploded perspective diagram for illustrating the work for engaging a support plate with a plugging member;

FIG. 7C is a cross-sectional diagram along line VIIB-VIIB of FIG. 7B;

FIG. 7D is a cross-sectional diagram along line VIIC-VIIC of FIG. 7B;

DETAILED DESCRIPTION OF THE INVENTION

Figure 1:
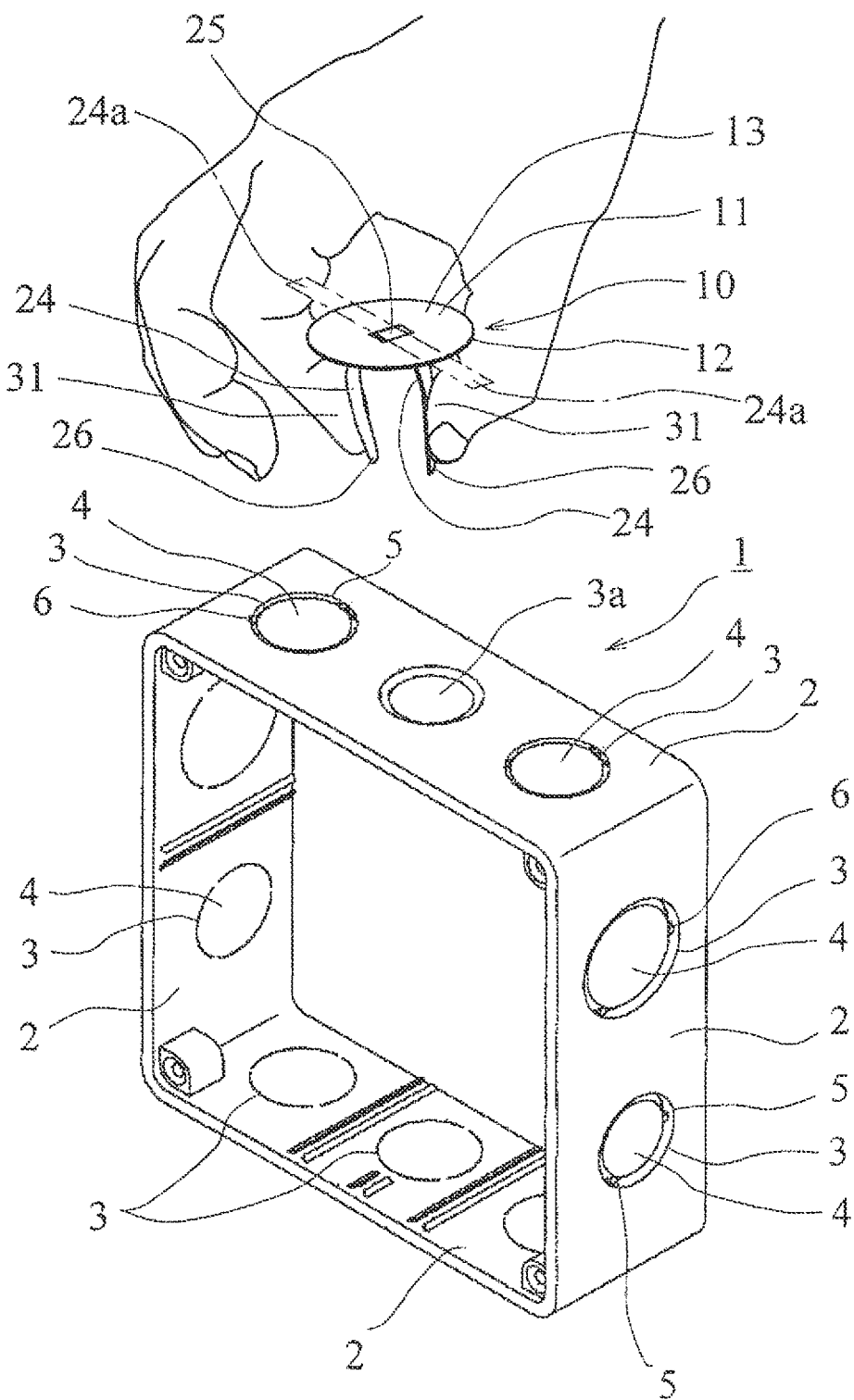
FIG. 1 is a perspective diagram for illustrating the relationship between a hole in a plate of which the opening is to be covered and a plug.

In the following, embodiments of the present invention are described in reference to the drawings. FIG. 1 is a perspective diagram for illustrating the relationship between a hole 3a in a plate 2 of which the opening is to be covered and a plug 10. A wire box 1 having the hole 3a to be covered is a well-known box (see Cited Document 1). This type of box is formed of iron plates or a synthetic resin material. 2, 2, 2, and 2 are plates (walls) on the periphery that are linked to each other. 3 denotes a hole having a blind cover 4 inside. The blind cover 4 inside each hole 3 can prevent bugs and the like from entering into the inside of the box 1. The blind covers 4 are linked to the inner periphery 5 of a hole through microscopic linking portions 6 (two points of attachment) so that detachment and separation are easy in the case where it is desired for the blind cover 4 to simply be removed in order for a wire pipe to be attached to the inside of the hole in a well-known manner. 3a denotes a hole from which the blind cover 4 has been mistakenly removed from the inside of the hole 3 in the plate 2.

10 denotes a plug that is provided with a plugging member 11 and a support plate 24.

Figure 5:
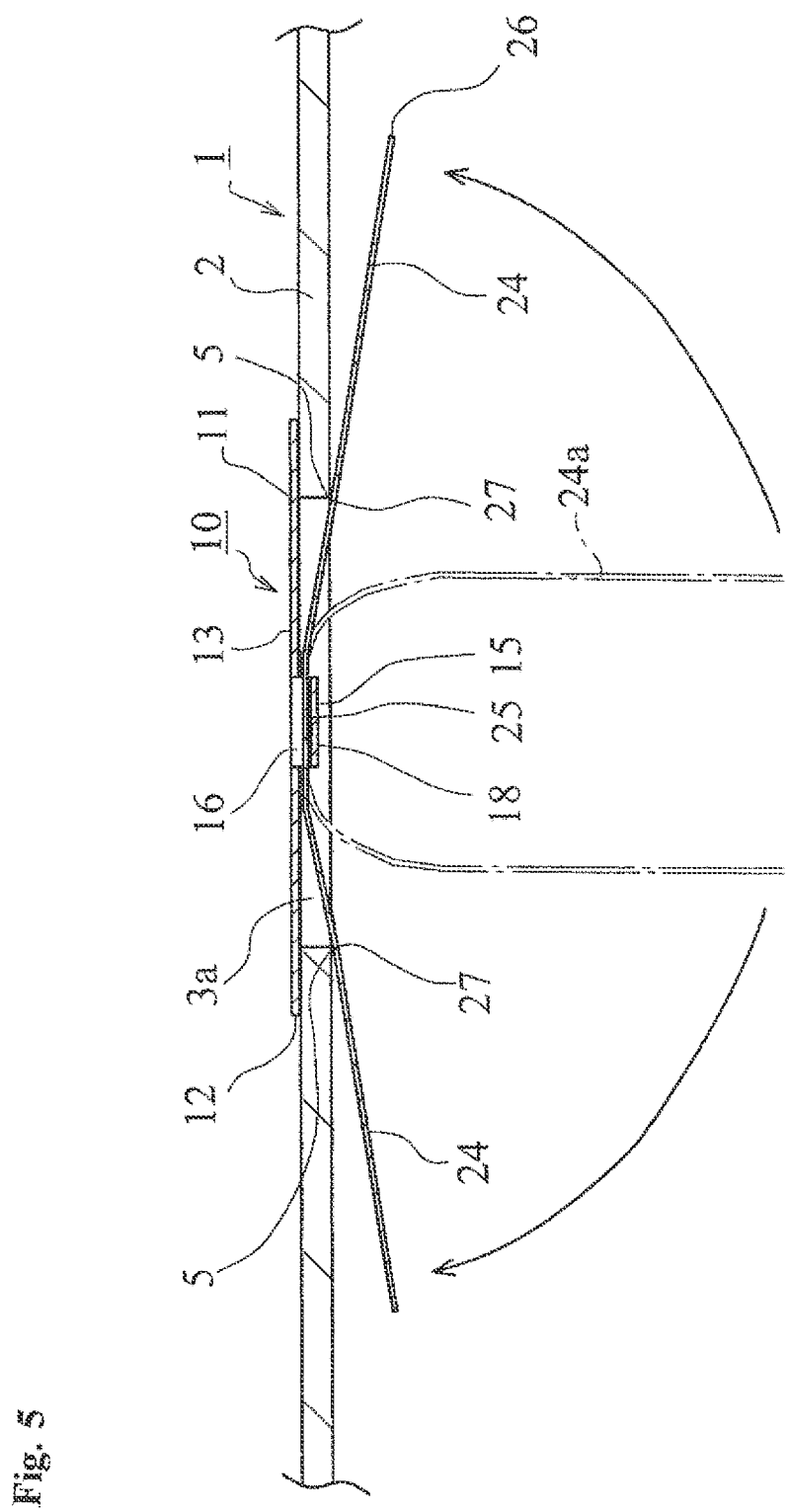
FIG. 5 is a cross-sectional diagram for illustrating the state where a plug has been engaged with a hole to be covered.

As shown in the figures, the plugging member 11 is formed to have a size that is sufficiently large to cover the hole 3a in the plate 2 of which the opening is to be covered. In the case where the diameter of the hole 3a is 20 mm, for example, the diameter of the plugging member 11 is set to approximately 30 mm so that the plugging member 11 has a large enough size to prevent the opening 5 of the hole 3a from being exposed to the outside even in the case where the plugging member 11 slightly shifts to the side relative to the hole 3a as shown in FIG. 5. The plugging member 11 is made of a hard material, such as iron or a synthetic resin, and may be a disc of which the shape as viewed from the top may be any form that can easily cover the opening 3a, such as a perfect circle, an ellipse, or a polygon. The thickness may be such that the state where pressure is applied to the contact, as in FIGS. 5 and 7, can be maintained, and is 0.4 mm to 0.5 mm, for example.

Figure 3:
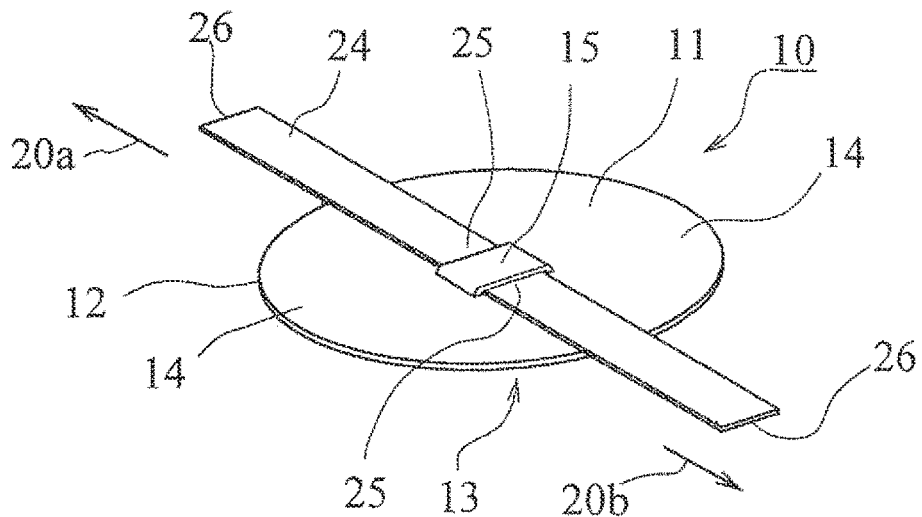
FIG. 3 is a perspective diagram showing the rear surface of the plug.

As shown in FIGS. 3 and 7B, the plugging member 11 is provided with a protruding portion 15 in a bridge form on the rear side in approximately the center portion. The protruding portion 15 is a portion of the plugging member 11 protruding from the rear surface 14.

Figure 2A:
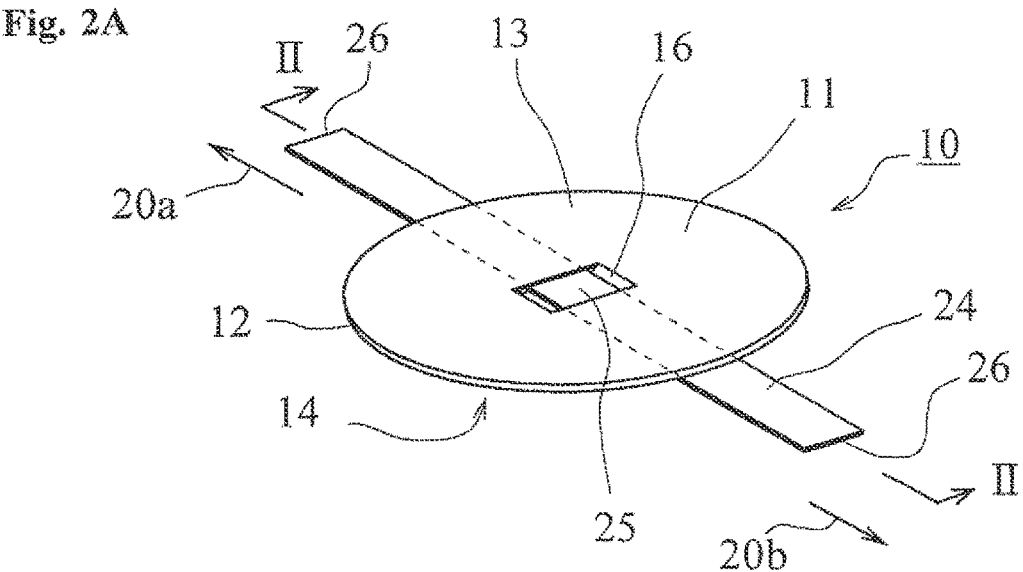
FIG. 2A is a perspective diagram showing a plug.
Figure 2B:
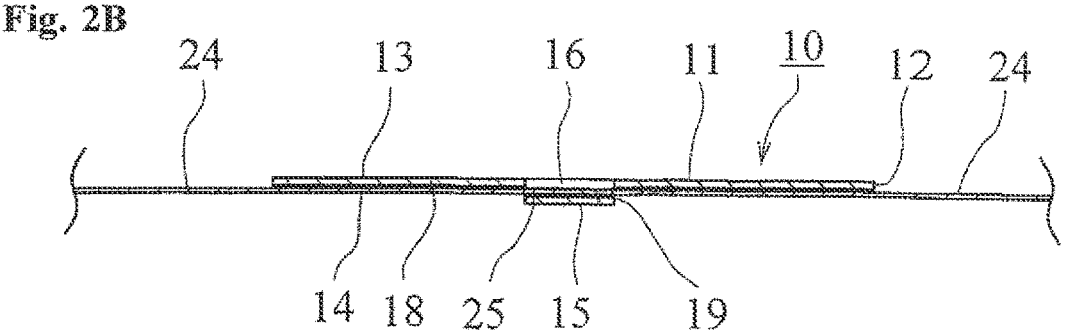
FIG. 2B is a cross-sectional diagram along line II-II of FIG. 2A.

As can be seen from FIGS. 7C and 7D, the protruding portion 15 in bridge form protrudes in such a state that a support plate 24 can be inserted through a gap 19 between the bottom surface 18 of the protruding portion 15 in bridge form and the rear surface 14 of the plugging member 11 in the direction from left to right so that the support plate 24 lays along the rear surface 14 of the plugging member 11 (see FIG. 2B). Here, 15a denotes a portion through which the protruding portion 15 and the member 11 are connected to each other, and 15b denotes a portion through which protruding portion 15 and the member 11 are separated from each other (slit).

Next, as can be seen from FIGS. 1, 4, 5, and 9A to 9C, the support plate 24 is formed of an elastic material in a band shape so as to be freely bent or straightened between the position 24a denoted by a single-dotted chain line and the position 24 denoted by a solid line. The support plate 24 can be of any width or any thickness, but usually the width is 4 mm to 12 mm and the thickness is 0.2 mm to 0.3 mm corresponding to the size of the plugging member 11. In addition, the support plate 24 is positioned in a gap 19 inside the protruding portion 15 in such a state that the portion 25 that is approximately at the center of the support plate 24 is supported inside the protruding portion 15. The support plate 24 extends in the direction from left to right (20a, 20b) as shown in the figures so that the two ends 26, 26 protrude to the outside from the outer periphery 12 of the plugging member 11, and thus, the two ends 26, 26 can be bent between fingers 31, 31 (the length of the protrusion is approximately the same length of the radius of the plugging member 11 as shown in the figures, for example).

Next, a manufacturing method for a plug 10 having a plugging member 11 and a support plate 24 is described. First, a plugging member 11 shown in FIG. 7B is formed. In the case where the plugging member 11 is formed of a synthetic resin material, a product in a state as shown in FIG. 7B may be formed by means of a molding using well-known dies.

In the case where the plugging member 11 is formed of a metal material, a well-known press processing means (also referred to as sheet metal working means) is applied to a base material (iron plate) 33 in band form, as shown in FIG. 7A, so that plugging materials 11 are efficiently formed from a plate.

That is to say, a number of plugging members 11a are punched out from the iron plate 33 one after another, as shown in FIG. 7A, using well-known pressing dies (detached along cut lines 34), and thus, a great number of plugging members 11 are efficiently and successively made. At this time, such an operation is simultaneously carried out using the above-described press dies so that slits 15b on the two sides of the protruding portion 15 are created and the portion between the two slits is protruded through plastic deformation (or a recess 16 is created).

Next, an insertion step of engaging a support plate 24 (see FIG. 7B) that has been formed of an elastic material in band plate form in advance with the above-described protruding portion 15 in bridge form that has been provided on the rear side 14 of the plugging member 11 in approximately the center portion is described.

The support plate 24 in band form is inserted through the gap 19 between the bottom surface 18 of the protruding portion 15 in bridge form on the above-described plugging member 11 and the rear surface 14 of the plugging member 11 so that the center portion 25 of the support plate 24 is situated in such a manner that the support plate 24 lies along the rear surface 14 of the plugging member 11 and the two ends 26, 26 of the support plate 24 protrude from the outer periphery 12 of the plugging member 11, as shown in FIGS. 2 and 3.

Figure 8:
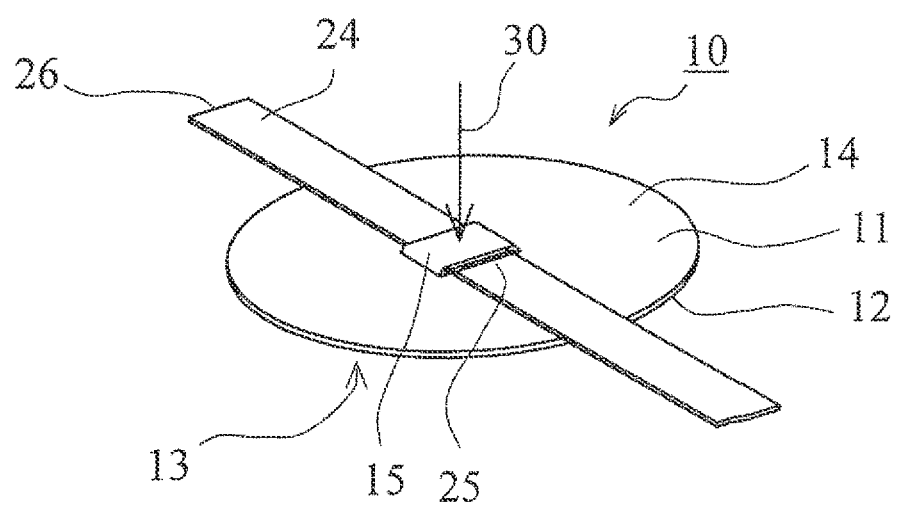
FIG. 8 is a perspective diagram showing the rear surface of the plug.

Furthermore, as can be seen from FIG. 8, the shape of the protruding portion 15 in bridge form may be changed by such a means that pressure is applied in the direction of arrow 30 so that the degree of contact between the bottom surface 18 of the protruding portion and the facing surface of the support plate 28 can be increased if necessary, that is to say, in the case where the support plate 24 is loosely inserted through the gap 19 (in the case where the engagement is too loose and it is possible for the support plate 24 to shift in the direction from left to right 20a, 20b relative to the gap 19). As for the means for increasing the degree of contact, a pressure applying step of increasing the degree of contact between the bottom surface 18 of the protruding portion and the facing surface of the support plate 24 using a small press or a hammer may be carried out.

In the case where the plugging member 11 is formed of a synthetic resin material, an adhesive may be injected into the protruding portion in bridge form on the plugging member or a pressure applying step of increasing the degree of contact between the bottom surface of the protruding portion and the facing surface of the support plate may be carried out by applying heat while simultaneously applying pressure towards the support plate inside the protruding portion.

The state in which the above-described structure is used is described below. In the case where it is desired to cover the hole 3a in the plate 2 in FIG. 1, a plug 10 having a plugging member 11 of which the diameter is slightly greater than that of the hole 3a to be covered is prepared (for example, plug 10 shown in FIGS. 2 and 9A to 9C). Here, it is convenient to prepare plugging members 11 of a number of sizes (for example, plugging members 11 of which the diameters are 20 mm, 25 mm, 40 mm, and 80 mm) in order to deal with various types of cases, such as cases where the hole 3a to be covered has a different diameter or the thickness of the plate with the hole 3a to be covered is different.

Figure 4:
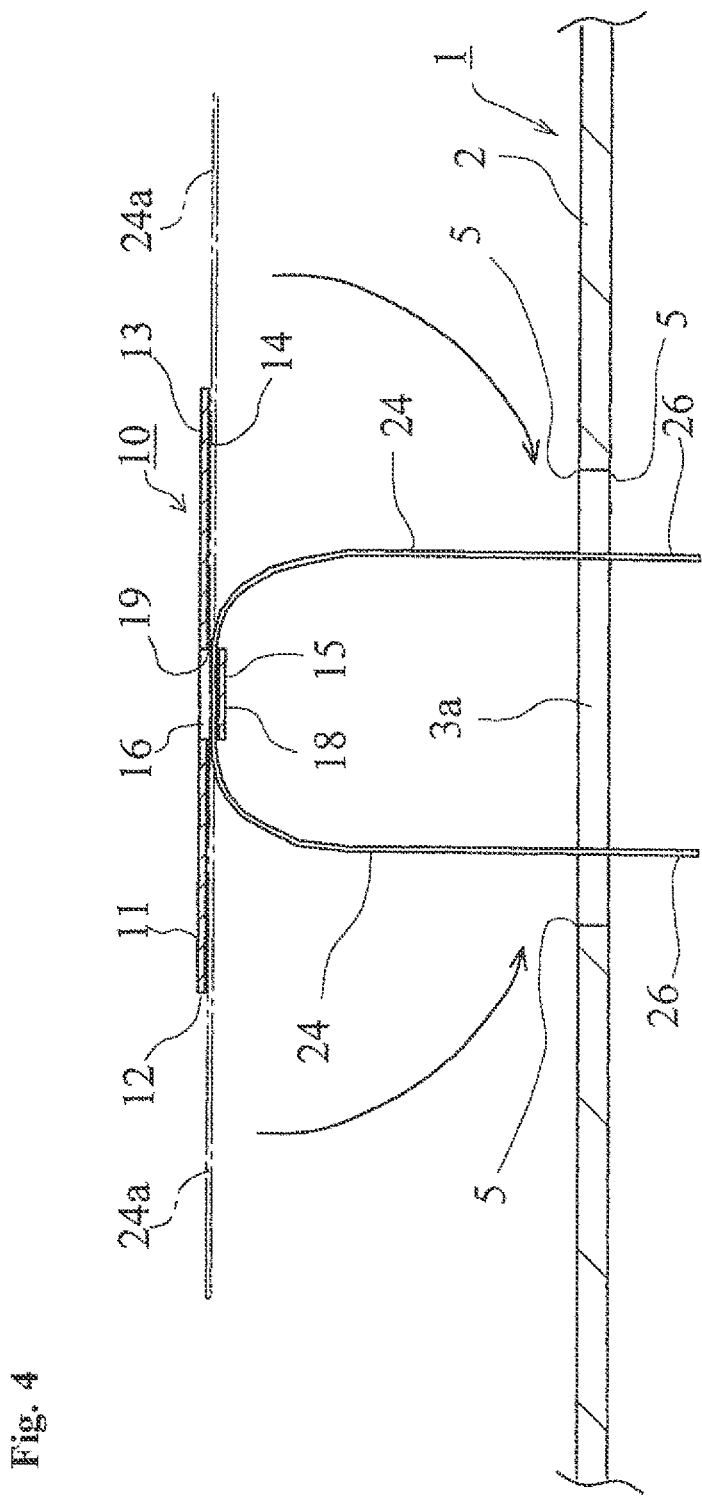
FIG. 4 is a cross-sectional diagram for illustrating the state where a plug is being engaged with a hole to be covered.

Next, the two ends 26, 26 of the support plate 24 in the state in FIG. 2 are pressed and bent by fingers 31, 31 through pressure greater than the elasticity of the support plate 24 so that the distance between the two ends 26, 26 is shortened so as to be inserted into the hole 3a, as shown in FIG. 1. That is to say, the state in FIG. 4 is achieved. Then, the fingers 31, 31 are moved away from the two ends 26, 26 while making the plugging member 11 approach the plate 2 so that the two ends 26, 26 of the support plate 24 move away from each other due to the elasticity of the support plate 24, and thus, the state in FIG. 5 is achieved. Namely, the periphery of the plugging member 11 makes close contact with the plate 2 due to the elasticity of the support plate 24, and thus, the opening of the hole 3a is covered. In addition, the portions that make contact through elasticity 27, 27 located between the engagement portion 25 of the support plate 24 and the two ends 26, 26 are pressed against the inner periphery 5, 5 of the hole 3a so that the state in which the periphery of the plugging member 11 is pressed against the plate 2 is maintained. Even in the case where force is applied to the plugging member 11 in such a direction as to move the plugging member 11 to the side, a counterforce works so that the plugging member 11 is always maintained between the two portions on the inner periphery 5, 5.

Figure 6:
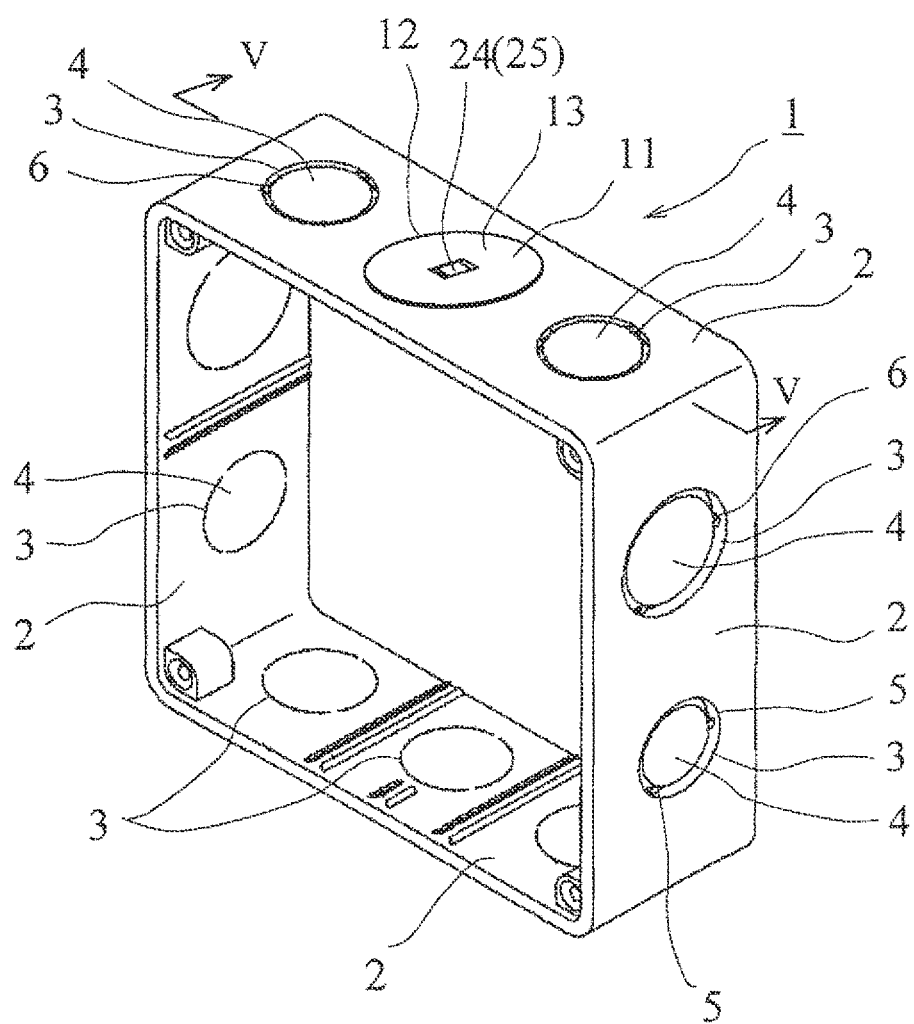
FIG. 6 is a perspective diagram showing a state where a plug has been engaged with the hole in the plate of which the opening was to be covered.

Thus, the plug 10 in the figures can cover the hole 3a in a plate 2 in such a state that the plugging member 11 is pressed against the plate 2 in such a state that the surface 13 is exposed through a one-touch operation (see FIG. 6).

In the above, a case where the opening of a hole 3a in a plate 2 of a wire box 1 is covered with a plugging member 11 is described. However, the plug 10 according to the present invention may be used for the plate 2 of other types, and for example, the plug may be used to cover the opening of a hole (knothole) in a wooden plate wall or cover unnecessary holes in a plate of a frame for concrete when the frame is reused.

A case where a hole in a plate of a frame is to be covered as described above is described in reference to FIGS. 9A to 9C. The plates 2a, 2b, and 2c are respectively part of a plate of a metal frame where the surface on which a plugging member 11 is engaged is used as the surface that makes contact with concrete.

Figure 9A:
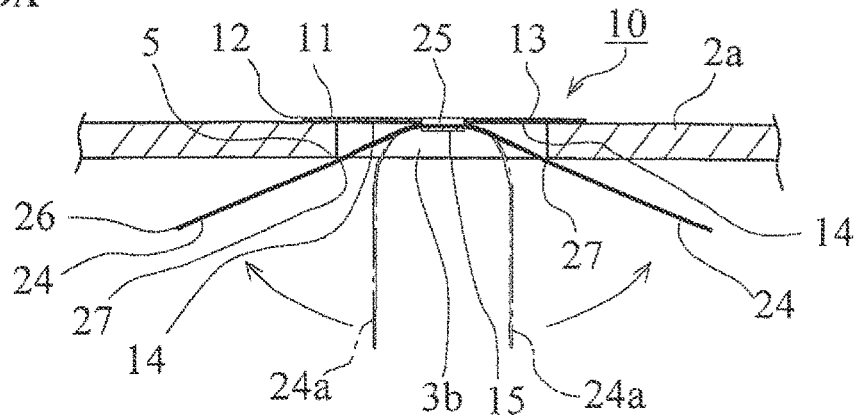
FIG. 9A is a cross-sectional diagram showing a portion in such a state that a plug has been engaged with a hole created in a plate of a frame.
Figure 9B:
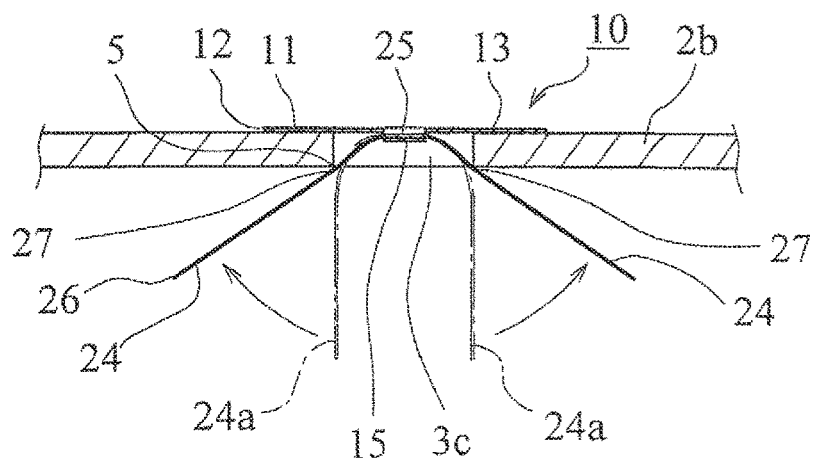
FIG. 9B is a cross-sectional diagram showing a portion in such a state that a plug has been engaged with a hole created in a plate of a frame in the case where the size of the hole is smaller than that in FIG. 9A.
Figure 9C:
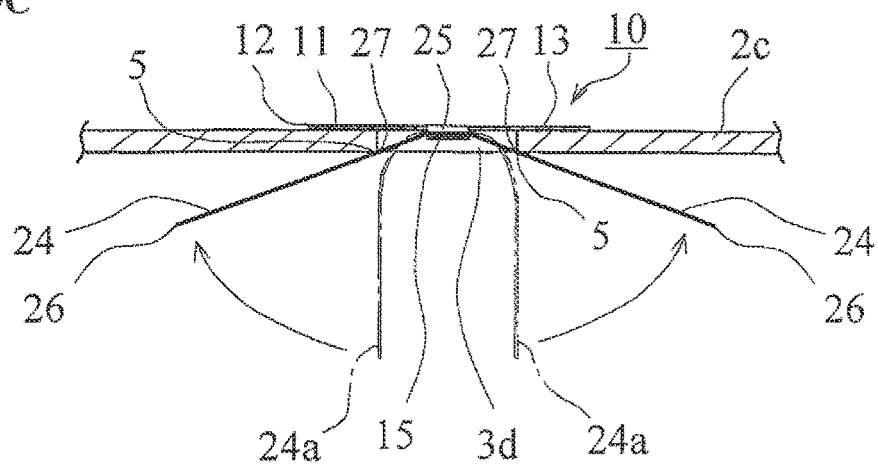
FIG. 9C is a cross-sectional diagram showing a portion in such a state that a plug has been engaged with a hole created in a plate of a frame in the case where the thickness of the plate is greater than that in FIG. 9B.

The hole 3c in FIG. 9B is smaller than the hole 3b in FIG. 9A. The thickness of the plate 2c in FIG. 9C is thinner than the thickness of the plate 2b in FIG. 9B. As can be seen from these figures, the degree of bending of the support plate 24 having elasticity changes in response to the size of the hole or the thickness of the plate so that the hole 3b, 3c, or 3d in the plate 2a, 2b, or 2c is covered by the above-described plugging member 11 of which the state can be maintained by means elasticity even in the case where the size of the hole or the thickness of the plate of the frame is slightly different. In these cases, the working effects or the functions are not substantially inferior to the above-described case. In the case where the size of the hole or the thickness of the plate is different to a great extent, the size of the plug 10 may be changed in order to deal with the situation.

Here, the same symbols as in FIGS. 1 to 8 are attached to the components in FIGS. 9A to 9C that are considered to have the same or equal functions, properties, means, or features as the components in FIGS. 1 to 8, and therefore, the same explanations are not repeated.

As many apparently widely different embodiments of this invention may be made without departing from the spirit and scope thereof, it is to be understood that the invention is not limited to the specific embodiments thereof except as defined in the appended claims.

The invention claimed is:

1. A plug for a hole created in a plate, comprising a plugging member and a support plate, wherein
   the plugging member is formed of a size which is sufficiently large enough to cover the hole created in the plate,
   a protruding portion in bridge form is located on a rear surface of the plugging member in approximately a center portion by making a part of a member protrude from the rear surface of the plugging member,
   the protruding portion in bridge form protrudes in such a state that a gap is created between a bottom surface of the protruding portion in bridge form and the rear surface of the plugging member,
   the support plate is located through the gap in a direction from left to right in such a state that the support plate lies along the rear surface of the plugging member, and
   the support plate that lies inside said protruding portion in bridge form is formed of an elastic material in a band flat plate form from end to end as viewed from both the top and bottom surfaces of the support plate and wherein two ends of the support plate individually protrude equally right and left in a straight manner from the outer periphery of the plugging member, is positioned in such a state that a portion that is approximately at a center of the support plate is supported inside the protruding portion, and extends in the direction from left to right so that the two ends protrude to outside from an outer periphery of the plugging member, to form flat-plate shaped extension parts, so as to be able to be bent between fingers.

2. The plug for a hole created in a plate according to claim 1, wherein the plugging member is formed of a metal material.

3. The plug for a hole created in a plate according to claim 1, wherein the plugging member is formed of a synthetic resin material.

4. A plurality of the plugs of claim 1 stacked in parallel to each other.

5. The plug for a hole created in a plate according to claim 1, wherein the plugging member is 0.4 mm to 0.5 mm thick.

6. The plug for a hole created in a plate according to claim 1, wherein the support plate has a width of 4 mm to 12 mm and a thickness of 0.2 mm to 0.3 mm.

7. A method for attaching a plugging member to a hole created in a plate which comprises obtaining the plug of claim 1, pinching the ends of the support plate that protrude from the two sides of the plugging member; then inserting the ends of the support plate into the hole from the front side of the plate.

8. The method according to claim 7, wherein the ends of the support plate are inserted into the hole so that the support plate extends in a reverse V shape on the rear side of the plate.

9. The plug for a hole created in a plate according to claim 1, wherein a length of each flat-plate shaped extension part protruding outward from the outer periphery of the plugging member is elongated in a manner permitting operation that in individual extension parts, fingers are respectively applied to facing surfaces individually facing the plate and thereby the flat-plate shaped extension parts are respectively pushed and bent in a direction departing from the rear surface of the plugging member into positions where the individual flat-plate shaped extension parts become parallel to each other.

10. The plug for a hole created in a plate according to claim 1, wherein an extension state of each flat-plate shaped extension part protruding outward from the outer periphery of the plugging member is set in a state permitting operation that in the individual extension parts, fingers are respectively applied to facing surfaces individually facing the plate and thereby the flat-plate shaped extension parts are respectively pushed and bent in a direction individually departing from the rear surface of the plugging member and, further, the extension state of each extension part is set in a state permitting pushing and bending operation such that a gap which is long in a direction of the length of the support plate and capable of accommodating an inner periphery of the hole in the plate can be formed in each part between the rear surface of the plugging member and the facing surface of each support plate facing the same.

11. The plug for a hole created in a plate according to claim 1, wherein the length of each flat-plate shaped extension part protruding outward from the outer periphery of the plugging member is set approximately the same length of the radius of the plugging member.

12. A method for attaching a plugging member to a hole created in a plate which comprises obtaining the plug of claim 1; then applying two fingers respectively to the flat-plate shaped extension parts located on both sides of the support plate and then pushing and bending the support plate with the fingers in a manner of overcoming an elasticity of the support plate so as to reduce a distance between the two ends; after that, inserting the two ends into the hole; and then, removing the fingers from the two ends with bringing the plugging member close to the plate so that the two ends of the support plates operate in a direction departing from each other by virtue of an own elastic force and thereby the support plates respectively abut against peripheries of the hole and simultaneously, the flat rear surface of the plugging member and the portions that make contact through elasticity located in each flat facing surface of the support plate make close contact in an elastic manner with an inner periphery of the hole in the plate located there between so as to fix the plugging member to the opening of the hole.

* * * * *